Aug. 4, 1942. J. M. GWINN, JR 2,291,894
PULLEY DEVICE
Filed July 20, 1940
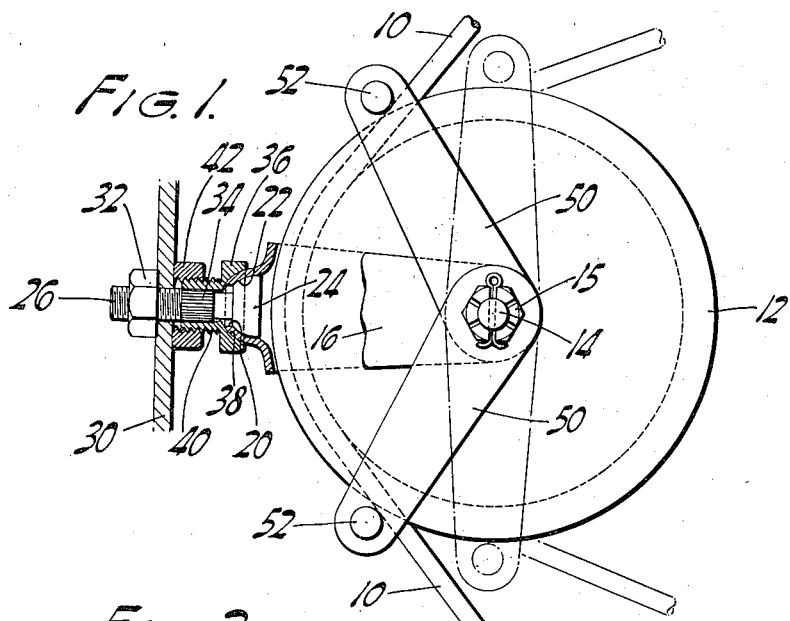
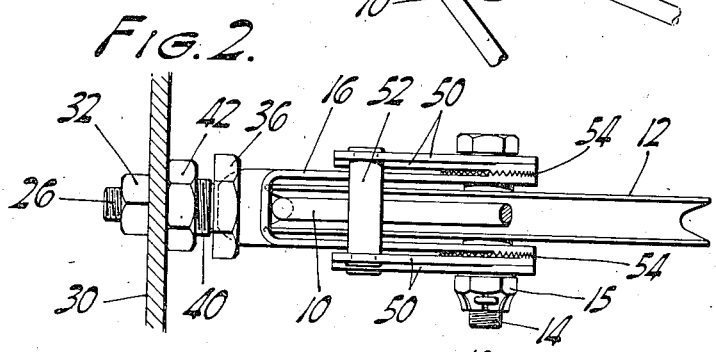
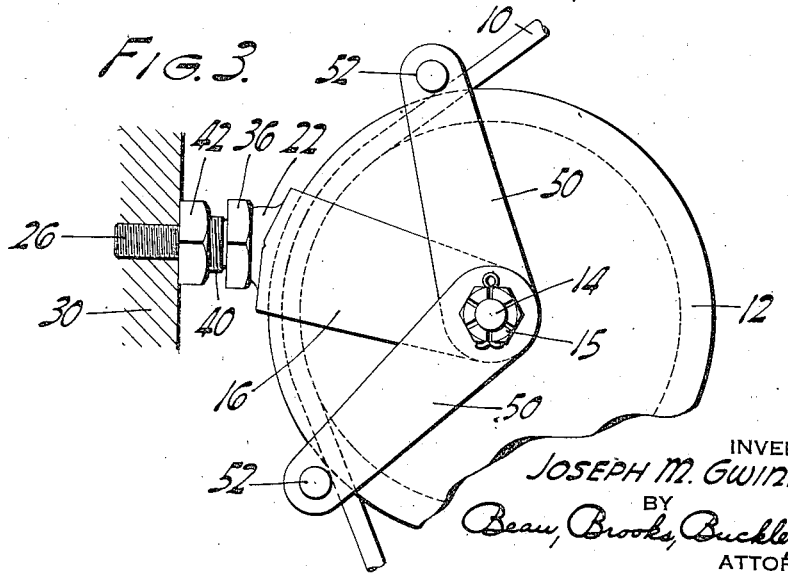
INVENTOR
JOSEPH M. GWINN JR.
BY
Beau, Brooks, Buckley & Beau
ATTORNEYS Patented Aug. 4, 1942

2,291,894

UNITED STATES PATENT OFFICE 2,291,894

PULLEY DEVICE

Joseph M. Gwinn, Jr., Buffalo, N. Y., assignor to
Bell Aircraft Corporation, Buffalo, N. Y.

Application July 20, 1940, Serial No. 346,586

7 Claims. (Cl. 254—195)

This invention relates to pulley devices and aligning means therefor. For reasons of operating efficiency and safety, it is of vital importance, for example, in the case of aircraft construction, that the pulley sheave be in perfect alignment with the associated cable, and safe tolerances in this respect are very small. In connection with mass production operations it is usually impossible to insure that the openings drilled into the pulley supporting bracket member is in exact alignment with the correct line of the pulley yoke to provide proper alignment of the pulley sheave and the cable. For this reason pulley devices have been previously developed which provide relative swivelling movement between parts of the pulley supporting structure so that subsequent to mounting of the pulley upon its support the sheave may be moved into alignment with the cable simply by tightening the cable. However, such devices embody definite disadvantages in that the sheaves thereof are free to sag out of alignment with the cables whenever the cables become slackened. Hence, such devices are in proper operative condition only when first installed and prior to elongation of the cable as is normally experienced during service.

One of the objects of the present invention is to provide a cable pulley device which embodies a freely swivelable connection between the pulley sheave and the pulley supporting bracket in combination with means for permanently locking the connection device in any adjusted position so that the pulley sheave will remain permanently in alignment with the associated cable of the control system. Another object of the invention is to provide a cable pulley device of the character described which is of simple construction as may be readily and economically manufactured and assembled. Other objects and advantages of the invention will appear in the specification herein.

In the drawing:

Fig. 1 is a view partly in elevation and partly in section of a portion of a pulley device of the invention, showing portions thereof in different adjusted positions;

Fig. 2 is a plan of the device of Fig. 1; and

Fig. 3 is a fragmentary elevation corresponding to Fig. 1, but showing parts thereof disposed in different relation.

The invention is illustrated in the drawing as comprising a cable 10 threaded about the periphery of a sheave 12 which in turn is rotatably mounted upon a shaft 14. The shaft 14 is supported by means of a yoke 16 which is generally of U shaped form and of such construction as may be readily stamped from sheet metal or the like. The opposite ends of the yoke arms are apertured to receive the shaft 14 in conventional manner. The head or closed end portion of the yoke 16 is apertured as at 20 and pressed into parti-spherical form so as to provide a swivel socket 22 for engagement with a complementarily shaped head 24 of a mounting pin 26, the socket 22 and head 24 constituting a ball and socket connection between the yoke member 16 and the anchoring member 26. The shaft of the mounting pin 26 extends through the aperture 20 of the yoke 16 and into mounting engagement with the pulley supporting bracket 30 which may be any stationary portion of an aircraft fuselage, or the like. As illustrated in Figs. 1 and 2, the pin 26 is shown as being inserted through a drilled opening through the member 30, and permanently fastened therein by means of a nut 32. In Fig. 3, another form of mounting is illustrated wherein the opening in the member 30 is tapped so that the pin 26 may be screw threaded into the member 30.

The pin 26 is splined as at 34, and a swivel collar 36 is mounted in splined relation upon the pin 26 so as to be freely movable thereon axially of the pin. The swivel collar 36 is parti-spherically recessed at its outer face 38 in such manner as to complement the contour of the outer surface of the socket portion 22 of the yoke 16. The shank of the swivel collar 36 is externally threaded as at 40, and a lock nut 42 is threaded thereon.

To assemble the device of the invention upon a supporting structure the nut 42 is turned back upon the shank of the swivel collar 36 so as to be approximately flush with the outer end of the collar 36 and the pin 26 is inserted in the opening which has been previously provided in the supporting member 30 and locked therein as explained hereinabove. At this stage of the assembly process the swivel collar 36 bears only loosely against the socket portion 22 of the yoke 16, and the yoke 16 is thereby free to swivel in all directions about the center line of the pin 26. The cable 10 is then threaded upon the sheave 12 and made taut, as by manipulation of conventional turnbuckle devices or the like (not shown), thus drawing the sheave into exact alignment with the cable 10. Consequently, even though the opening through the member 30 may not be in alignment with the correct line of the yoke 16, the latter will nevertheless have been automatically moved into proper position in view of the actual position of the cable 10 (Fig. 3). The lock nut 42 is then turned outwardly upon the swivel collar 36 so as to bear against the member 30, and continued rotation of the nut 42 will thereby move the swivel collar 36 along the splined connection away from the member 30, thus forcing the outer face 38 of the swivel collar firmly against the socket portion 22 of the yoke. Thus, the yoke head will be firmly clamped between the pin head 24 and the swivel collar 36, and by means of one simple operation of turning the nut 42 a permanently rigid mounting of the connection device upon the supporting member 30 is effected and the yoke 16 is permanently locked in the correct adjusted angular attitude with respect to the supporting pin 26. Upon any subsequent slackening of the cable 10 the pulley device will nevertheless remain in proper position. To facilitate the swivel locking operation the swivel collar 36 is preferably formed with a hexagonal outer surface portion as illustrated in the drawing, or with some other suitable outer surface form so as to enable the user to grasp the collar 36 with a wrench or the like to hold it against rotation relative to the bracket member 30 during adjusting movements of the locking nut 42. Consequently, the positions of the collar 36 and the pin 26 relative to the supporting bracket 30 will not be altered during locking of the nut 42.

The sheave 12 is also provided with a cable guard device which is in the form of a pair of oppositely disposed yoke members which are mounted at their open ends on the shaft 14 so as to extend about the sheave to guard against unintended displacement of the cable 10 from the peripheral groove of the sheave. As illustrated herein, the guards comprise opposite plate members 50 which are joined together in pairs at their outer ends by means of transverse pins 52. As illustrated in Fig. 2, the yoke 16 is externally serrated as at 54 in the region of the shaft 14, and the corresponding contiguous inner surface portion of one of the plates 50 of each pair thereof is similarly serrated so as to provide automatic locking of the opposed guard devices in any desired position of adjustment thereof upon tightening of the nut 15 on the shaft. Thus, it will be understood that by simply loosening the nut 15 the guard devices will be freed for rotation about the shaft 14 to any desired position relative to the yoke 16, as indicated by broken lines in Fig. 1. It will also be understood that this feature of the invention has been obtained through use only of simple and rugged parts which are interchangeable, thus effecting economies in connection with the manufacture and assembly thereof. It will be understood that the guard members may be of any other suitable design such as of one piece construction and in the form of simple U-shaped bent plates in lieu of the plate and pin assemblies illustrated in the drawing.

Although only one form of the invention has been shown and described in detail, it will be understood that the invention is not so limited but that various changes may be made therein without departing from the spirit of the invention or from the scope of the appended claims.

I claim:

1. A cable pulley for mounting upon a support, including a sheave rotatably mounted within a yoke and having a cable threaded thereon, said yoke being apertured in line with the plane of the center lines of said cable and of parti-spherical wall form concentrically of the apertured portion thereof, a mounting device in the form of a stud extending through said apertured portion and provided with an enlarged head at its inner end shaped complementary to said parti-spherical yoke portion for bearing against the inner surface of the latter, and a collar mounted upon said stud and splined thereto, said collar having an end portion thereof formed to complement the contour of the outer surface portion of said parti-spherical yoke portion 2. A cable pulley for mounting upon a support, including a sheave rotatably mounted within a yoke and having a cable threaded thereon, said yoke being apertured in line with the plane of the center lines of said cable and of parti-spherical wall form concentrically of the apertured portion thereof, a mounting device in the form of a stud extending through said apertured portion and provided with an enlarged head at its inner end shaped complementary to said parti-spherical yoke portion for bearing against the inner surface of the latter, a collar mounted upon said stud and splined thereto, said collar having an end portion thereof counterbored to complement the contour of the outer surface portion of said parti-spherical yoke portion, a lock nut threaded upon the other end portion of said collar, and connection means associated with the outer end of said stud and said support for rigidly mounting said stud upon said support.

3. A cable pulley for mounting upon a support, including a sheave rotatably mounted within a yoke and having a cable threaded thereon, said yoke being apertured in line with the plane of the center lines of said cable and of parti-spherical wall form concentrically of the apertured portion thereof, a mounting device in the form of a stud extending through said apertured portion and provided with an enlarged head at its inner end shaped complementary to said parti-spherical portion for bearing against the inner surface of said parti-spherical yoke portion, a collar mounted upon said stud and splined thereto, said collar having an end portion thereof formed to complement the contour of the outer surface portion of said parti-spherical yoke portion, and a lock nut threaded upon the other end portion of said collar, said collar being formed externally thereof with wrench engaging means for holding said collar against rotation during adjustments of said lock nut, said stud being threaded at its outer end portion for rigid mounting upon said support.

4. A cable pulley for mounting upon a support, including a sheave rotatably mounted within a yoke and having a cable threaded thereon, said yoke being formed of sheet metal bent into U shaped form and having an opening formed centrally thereof through the closed end portion thereof, said closed end portion being pressed outwardly into parti-spherical form concentrically of said opening, a mounting device in the form of a stud extending through said apertured portion and provided with an enlarged head at its inner end shaped complementary to said yoke parti-spherical portion for bearing against the inner surface of the latter, a collar mounted upon said stud and splined thereto, said collar having an end portion thereof counterbored to complement the contour of the outer surface of said parti-spherical yoke portion, and a lock nut threaded upon the other end portion of said collar, said stud being threaded at its outer end portion for rigid mounting upon said support.

5. In a cable pulley device, a member for connection to a supporting structure and means associated with said member for adjusting it relative to said structure, a cable, a sheave mounting said cable for guiding the latter, a yoke rotatably mounting the sheave, a ball and socket joint connecting the yoke and the supporting member, the center of rotation of the joint being in the plane of the sheave and cable whereby upon tightening of the cable the sheave will become aligned with the cable and the yoke will assume a predetermined position with respect to the supporting member, and means comprising a pair of screw threaded elements for simultaneously locking the first mentioned means and said ball and socket joint to maintain said member in adjusted relation to the structure and to maintain said yoke in said predetermined position.

6. In a cable pulley device, a stud screw threaded for attachment to a supporting structure, a sheave for mounting a cable and for guiding the latter, a yoke rotatably mounting the sheave, a ball and socket joint connecting the yoke and the stud, with the center of rotation of the joint substantially in the plane of the sheave whereby upon tightening of the cable the sheave will become aligned with the cable and the yoke will assume a predetermined position with respect to the supporting structure, and a pair of elements extending around said stud and adjustably screw threaded together for exerting locking pressure between the supporting structure and the yoke for locking the ball and socket joint and the connection of the stud to the supporting structure.

7. In a cable pulley device, a stud screw threaded for attachment to a supporting structure, a sheave for mounting a cable and for guiding the latter, a yoke rotatably mounting the sheave, a ball and socket joint connecting the yoke and the stud, with the center of rotation of the joint substantially in the plane of the sheave whereby upon tightening of the cable the sheave will become aligned with the cable and the yoke will assume a predetermined position with respect to the supporting structure, a pair of elements extending around said stud and adjustably screw threaded together for exerting locking pressure between the supporting structure and the yoke for locking the ball and socket joint and the connection of the stud to the supporting structure, and the screw threaded element that engages the yoke being engaged with the stud in non-rotatable relation thereto.

JOSEPH M. GWINN, Jr.